US010363776B2

(12) United States Patent
Park

(10) Patent No.: US 10,363,776 B2
(45) Date of Patent: Jul. 30, 2019

(54) WHEEL ROTATED BY LOAD APPLIED TO AXLE REMAINING STATIONARY AT ECCENTRIC POSITION

(71) Applicant: Joon Tai Park, Seoul (KR)

(72) Inventor: Joon Tai Park, Seoul (KR)

( * ) Notice: Subject to any disclaimer, the term of this patent is extended or adjusted under 35 U.S.C. 154(b) by 164 days.

(21) Appl. No.: 15/506,735

(22) PCT Filed: Aug. 25, 2015

(86) PCT No.: PCT/KR2015/008878
§ 371 (c)(1),
(2) Date: Feb. 25, 2017

(87) PCT Pub. No.: WO2016/032208
PCT Pub. Date: Mar. 3, 2016

(65) Prior Publication Data
US 2017/0253076 A1    Sep. 7, 2017

(30) Foreign Application Priority Data

Aug. 28, 2014  (KR) .................. 10-2014-0113186
Apr. 3, 2015  (KR) .................. 10-2015-0047602

(51) Int. Cl.
*B60B 9/26* (2006.01)
*B60B 19/00* (2006.01)
(Continued)

(52) U.S. Cl.
CPC ................ *B60B 9/26* (2013.01); *B60B 1/003* (2013.01); *B60B 9/28* (2013.01); *B60B 19/00* (2013.01);
(Continued)

(58) Field of Classification Search
CPC .. B60B 9/26; B60B 9/28; B60B 1/003; B60B 27/023; B60B 19/00; B60B 1/006;
(Continued)

(56) References Cited

U.S. PATENT DOCUMENTS 2,377,232 A * 5/1945 Herold ............... B60B 9/005
16/44
2,517,474 A * 8/1950 Fouse ................ A47L 1/02
15/103
(Continued)

FOREIGN PATENT DOCUMENTS

CN    103931313 A    7/2014
GB    2109752 A *    6/1983    ............... B60B 9/26
(Continued)

*Primary Examiner* — S. Joseph Morano
*Assistant Examiner* — Jean W Charleston
(74) *Attorney, Agent, or Firm* — Lee & Associates, LLC

(57) ABSTRACT

A wheel rotated by a load applied to an axle remaining stationary at an eccentric position is disclosed. The present invention comprises: the wheel configured such that the outer periphery of an inner rim of the wheel assembled to a wheel hub provided at the axle to which the load is applied applies pressure to a plurality of compressive force elastic bodies provided at the inner periphery of an outer rim of the wheel; and a control roller for pushing the outer rim of the wheel at a gap of a predetermined range such that the axle provided at the wheel hub always remains stationary at the eccentric position of the wheel.

4 Claims, 6 Drawing Sheets

(51) Int. Cl.
  *B60B 1/00* (2006.01)
  *B60B 27/02* (2006.01)
  *B62K 25/02* (2006.01)
  *B62M 21/00* (2006.01)
  *B60B 9/28* (2006.01)
  *B62K 25/04* (2006.01)

(52) U.S. Cl.
  CPC ............ *B60B 27/023* (2013.01); *B62K 25/02* (2013.01); *B62M 21/00* (2013.01); *B60B 1/006* (2013.01); *B60Y 2200/13* (2013.01); *B60Y 2200/84* (2013.01); *B62K 2025/042* (2013.01)

(58) Field of Classification Search
  CPC .. B62M 21/00; B62K 25/02; B62K 2025/042; B60Y 2200/84
  USPC .................................. 152/38, 39, 69, 75, 80
  See application file for complete search history.

(56) References Cited

U.S. PATENT DOCUMENTS

| | | | | |
|---|---|---|---|---|
| 4,588,232 | A | * | 5/1986 | Kim .................... B60B 27/0047 280/229 |
| 5,249,847 | A | * | 10/1993 | Lee ......................... B60B 27/00 280/229 |
| 6,371,571 | B1 | * | 4/2002 | Tsan .................... B60B 27/0047 280/229 |

FOREIGN PATENT DOCUMENTS

| | | |
|---|---|---|
| JP | 3101271 U | 2/2004 |
| JP | 2006-188211 | 7/2006 |
| KR | 10-2009-0011982 | 2/2009 |

* cited by examiner

WHEEL ROTATED BY LOAD APPLIED TO AXLE REMAINING STATIONARY AT ECCENTRIC POSITION

CROSS-REFERENCE TO RELATED APPLICATIONS

This application is a national stage application of International Patent Application No. PCT/KR2015/008878 filed on Aug. 25, 2015, which claims priority to Korean Patent Application No. 10-2014-0113186 filed on Aug. 28, 2014, and Korean Patent Application No. 10-2015-0047602 filed on Apr. 3, 2015, the entire contents of which are incorporated by reference herein.

TECHNICAL FIELD

The present invention relates to a wheel rotated by a load (an external force or weight applied to an object) kept applied to an axle mounted on a load frame or a chain stay of a bicycle, and more particularly, to a wheel rotated by a load kept applied to an axle mounted on a hub always remaining stationary at an eccentric position of the wheel spaced horizontally from the center of the wheel by a given distance.

BACKGROUND

Generally, a wheel may be rotated by the eccentric weight applied by the load applied to an axle mounted at an eccentric position of the wheel spaced horizontally from the center of the wheel rolling on the flat ground by a given distance, but if the axle mounted at the eccentric position of the wheel reaches the lower side of the wheel on a vertical line from the center of the wheel, the wheel is not kept rotated anymore by means of the load applied to the axle.

SUMMARY OF THE DISCLOSURE

Accordingly, the present invention has been made in view of the above-mentioned problems occurring in the prior art, and it is an object of the present invention to provide a wheel that is rotated by a load kept applied to an axle always remaining stationary at an eccentric position of the wheel with a starting point at which the outer rim of the wheel rolling on the flat ground comes into contact with the ground, so that the wheel is rotated toward the eccentric position to which the load is applied according to the rolling principle of the wheel.

To accomplish the above-mentioned object, according to a first aspect of the present invention, there is provided a wheel rotated by a load applied to an axle remaining stationary at an eccentric position thereof, the axle mounted on a hub in such a manner as to always remain stationary at the eccentric position of the wheel, the eccentric position being spaced apart horizontally from the center of the wheel by a given distance, the wheel including: a plurality of elastic bodies mounted on the inner periphery of an outer rim of the wheel to control (pressurize or tension) the outer periphery of an inner rim of the wheel coupled to the hub rotatably coupled to the axle; and a control roller mounted on a fixed frame or a control roller stay of a bicycle to push the outer rim of the wheel, whereby the axle mounted on the hub always remains stationary at the eccentric position of the wheel.

According to the present invention, desirably, the hub is disposed at the eccentric position of the wheel spaced apart from the center of the wheel by the given distance so as to allow the axle to always remain stationary at the eccentric position of the wheel crossing a position where an inclination angle is moved by a given distance horizontally from the line having an inclination degree of about 89° or under and the center of the wheel 10 at a support point as a starting point at which the outer periphery of the outer rim of the wheel comes into contact with the horizontal ground.

According to the present invention, desirably, the axle mounted on the hub always remains stationary at the eccentric position of the wheel spaced apart horizontally from the center of the wheel by the given distance, so that the wheel is rotated by the load kept applied to the axle of the hub mounted on a load frame or a chain stay of a bicycle.

According to the present invention, desirably, even if the wheel is kept rotated, the axle always remains stationary at the eccentric position of the wheel spaced apart horizontally from the center of the wheel by the given distance, and the control roller mounted on a shaft coupled to the fixed frame or the control roller stay of the bicycle controls (pushes the outer rim of the wheel to allow the center of the hub mounted on the axle to be spaced apart from the center of the wheel by the given distance) the outer rim of the wheel, so that the wheel is rotated by the load kept applied to the axle of the hub mounted on the load frame or the chain stay of the bicycle.

According to the present invention, desirably, the plurality of elastic bodies mounted on the inner periphery of the outer rim of the wheel control (pressurize or tension) the outer periphery of a rotation body mounted on the load frame or the outer periphery of the inner rim of the wheel coupled to the hub coupled to the chain stay of the bicycle, so that the center of the hub fitted to the axle disposed on the load frame or the chain stay of the bicycle always remains stationary at the eccentric position of the wheel spaced apart horizontally from the center of the wheel by the given distance.

According to the present invention, desirably, the control roller, which has a function of allowing the center of the hub to be spaced apart from the center of the wheel by the given distance, is not fixedly mounted on the fixed frame or the control roller stay of the bicycle, but is mounted movably forward and backward on the fixed frame or the controller roller stay of the bicycle so as to allow the distance between the center of the hub and the center of the wheel to be arbitrarily adjusted.

To accomplish the above-mentioned object, according to a second aspect of the present invention, there is provided a wheel 500 rotated by a load applied to an axle 301A remaining stationary at an eccentric position thereof, the wheel 500 including: a controller roller 303 for pushing an outer rim 500B so as to allow the axle 301A mounted on a rotation body 500A to always remain stationary at the eccentric position of the wheel 500 by means of a plurality of elastic bodies 400 mounted on the inner periphery of the outer rim 500B; a load frame 301 connected to a fixed frame 302 by means of a hinge shaft 302A so as to allow the wheel 500 to be rotated in position, without any rolling on the ground, by means of the load kept applied to the axle 301A always remaining stationary at the eccentric position of the wheel 500; and the axle 301A mounted movable upward and downward on the load frame 301 to permit the wheel 500 mounted thereon to be engagedly rotated with a power wheel 300 mounted on a drive shaft 300A, so that the drive shaft 300A fixedly mounted on the power wheel 300 is rotated by means of the rotational force of the wheel 500 rotating by the load kept applied to the axle 301A.

According to the present invention, desirably, a driving force is generated from the power wheel 300 so as to allow the wheel 500 to be engaged with the outer rim 500B engagedly rotating with the power wheel 300, without any rolling on the ground.

According to the present invention, desirably, the load frame 301 is connected to the fixed frame 302 by means of the hinge shaft 302A so as to allow the load frame 301 mounted on the axle 301A to be mounted movable upward and downward on the fixed frame 302, and the outer periphery of the rotation body 500A pressurizes the plurality of elastic bodies 400 mounted on the inner periphery of the outer rim 500B by means of the load applied to the rotation body 500A, so that the control roller 303 mounted on a shaft 303A disposed on the fixed frame 302 controls (allows the center of the rotation body 500A to be spaced apart from the center of the wheel 500 by a given distance) the outer rim 500B mounted on the axle 301A to allow the wheel 500 to always remain stationary at the eccentric position thereof and a load controller 401 controls the tensile stress of a tension elastic body 400A connected between the lower portion of the fixed frame 302 and the load frame 301 and a pressure elastic body 400B connected between the upper portion of the fixed frame 302 and the load frame 301 to allow the drive shaft 300A to be rotated in a direction of an arrow f so that the power wheel 300 is rotated in the direction of the arrow f by means of the rotational force permitting the wheel 500 mounted on the axle 301A to be rotated in a direction of an arrow e through the load kept applied in a direction of an arrow d to the load frame.

If the wheel of the present invention is applied to the wheel mounted on a transportation device (bicycle, wheelbarrow, wheelchair, other various transportation machines and so on), the wheel of the transportation device is rotated by the load applied to the axle of the transportation device.

Further, the load applied to the load frame 301 by means of the elastic forces of the elastic bodies 400A and 400B is applied to the axle 301A so that the load is kept applied to the axle 301A to allow the axle 301A to always remain stationary at the eccentric position of the wheel 500, and accordingly, the wheel 500 is rotated and the power wheel 300 engagedly operating with the wheel 500 is rotated, so that a driving force is generated from the drive shaft 300A fixedly mounted on the power wheel 300 engagedly operating with the wheel 500 rotating by the load kept applied in the direction of the arrow d to the load frame 301.

Figure 1:
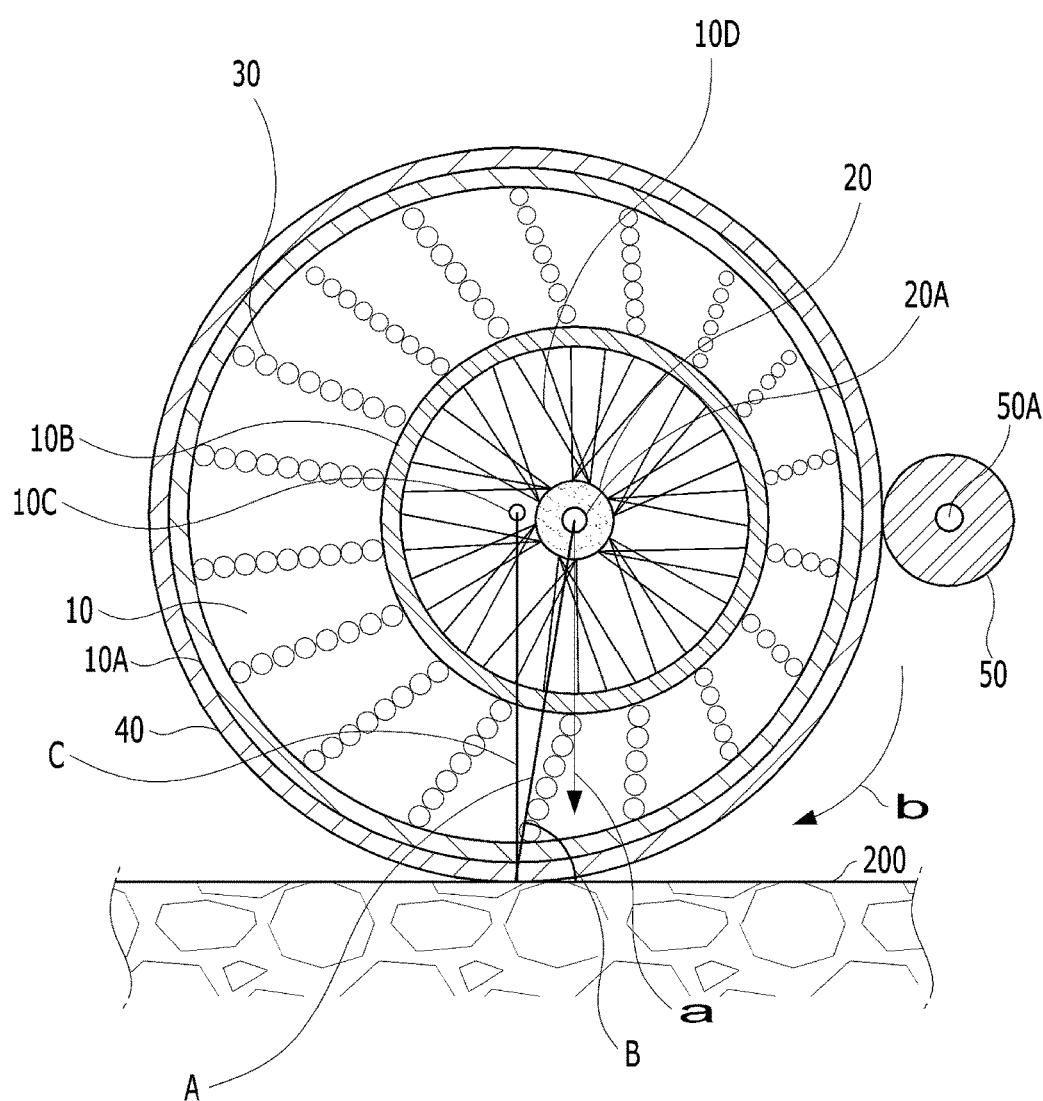
FIG. 1 is a cross sectional view showing the operating state of a wheel and a controller roller according to a first embodiment of the present invention.

10: wheel
10A: outer rim of the wheel
10B: inner rim of the wheel
10C: center of the wheel
10D: wheel spoke
20: hub
20A: axle
30: elastic body
40: tire
50: control roller
50A: shaft
100: bicycle frame
101: chain stay
102: control roller stay
103: saddle
300: power wheel
300A: drive shaft
301: load frame
301A: axle
302: fixed frame
302A: hinge axis
303: controller roller
303A: shaft
400: elastic body
400A: tension elastic body
400B: pressure elastic body
401: load controller
402: roller
500: wheel
500A: rotation body
500B: outer rim of the wheel
A: inclination degree
B: inclination angle
C: vertical line
a: load application
b: rotation direction of wheel 10
c: rotation direction of control roller 50
d: application direction of load
e: rotation direction of wheel 500
f: rotation direction of power wheel 300

DETAILED DESCRIPTION OF PREFERRED EMBODIMENTS

First, an explanation on the configuration and operation of a wheel 10 coupled to a bicycle according to the present invention will be given with reference to FIGS. 1 and 3.

According to a first embodiment of the present invention, the wheel 10 is configured wherein a hub 20 rotatably fitted to an axle 20A mounted on a chain stay 101 of a bicycle frame 100 is connected to the inner periphery of an inner rim 10B of the wheel 10 by means of a plurality of wheel spokes 10D and a plurality of elastic bodies 30 mounted on the outer periphery of an outer rim 10B of the wheel 10 coupled to a tire 40 are connected tensilely to the outer periphery of the inner rim 10B of the wheel 10 coupled to the hub 20.

With a support point 201 as a starting point at which the tire 40 coupled to the outer periphery of the outer rim 10A of the wheel 10 comes into contact with the ground 200 through a vertical line C at a center 10C of the wheel 10, so as to allow the axle 20A to always remain stationary at an eccentric position of the wheel 10 crossing a position where an inclination angle B is moved by a given distance horizontally from the line having an inclination degree A of about 89° or under and the center 10C of the wheel 10, the axle 20A and a shaft 50A are spaced apart horizontally from each other by a given distance, so that the shaft 50A is mounted on a control roller stay 102 of the bicycle frame 100 and a control roller 50 fitted to the shaft 50A controls (that is, allows the center of the hub 20 to be spaced apart from the center of the wheel by a given distance) the tire 40 coupled to the outer periphery of the outer rim 10A of the wheel 10.

Figure 3:
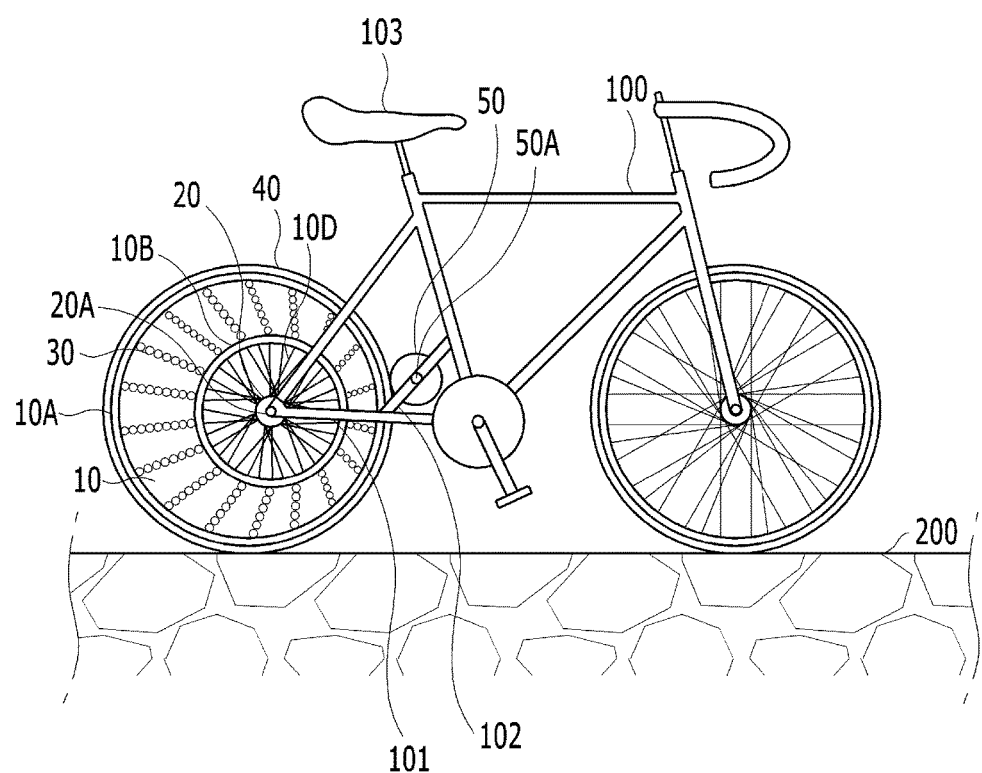
FIG. 3 is a front view showing the wheel and the controller roller according to the present invention, which are mounted on a bicycle.
Figure 4:
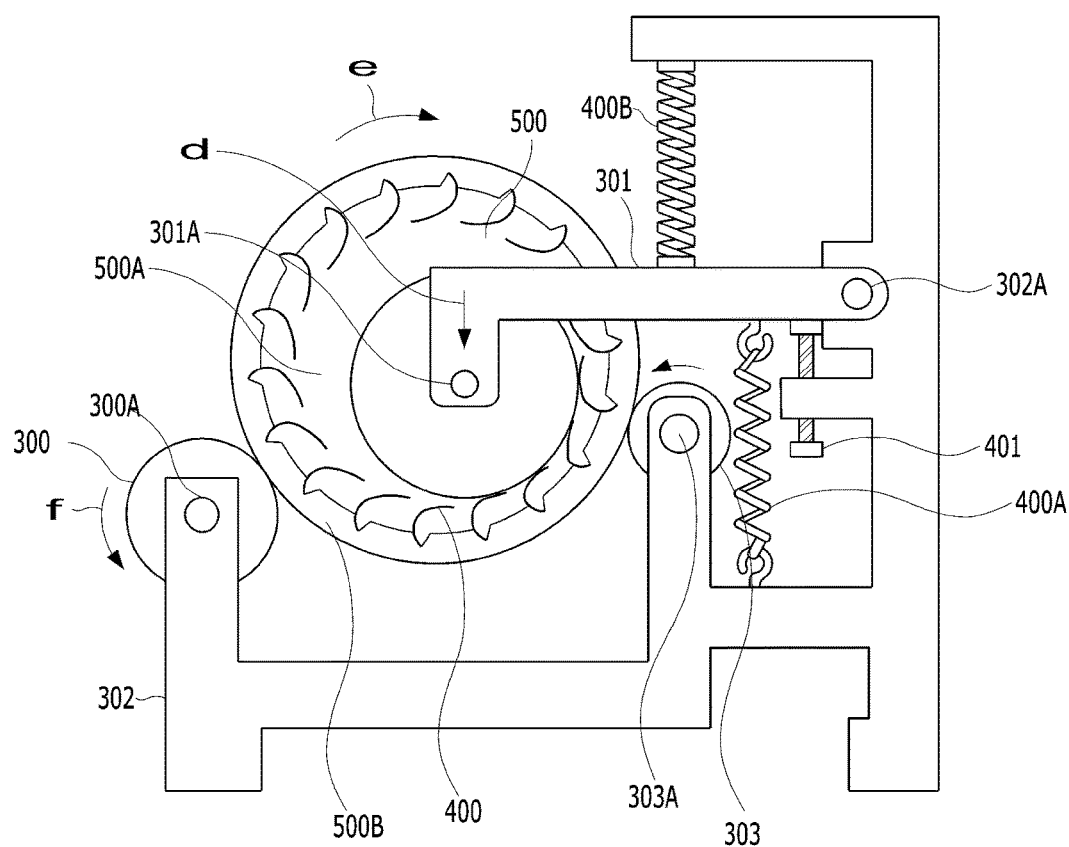
FIG. 4 is a front view showing the operation of a wheel according to a second embodiment of the present invention, wherein the wheel is disposed on an axle mounted on a load frame connected to a fixed frame by means of a hinge shaft.
Figure 5:
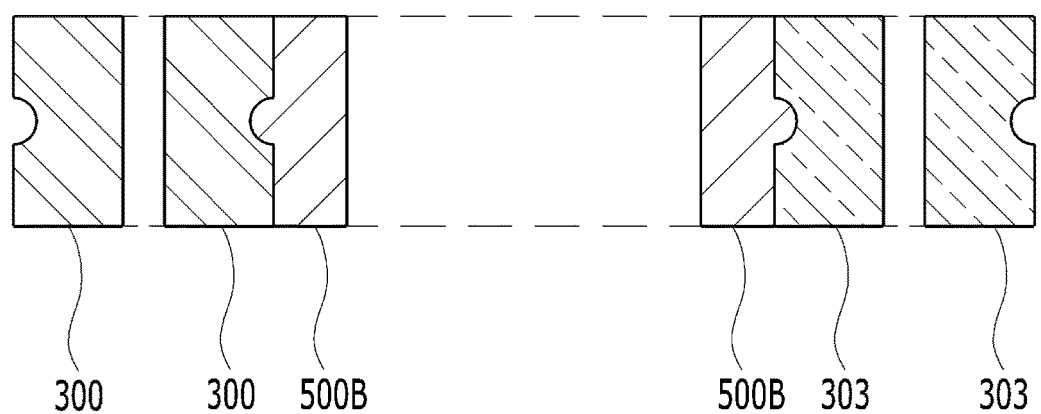
FIG. 5 is a cross sectional view showing an outer rim of the wheel according to the second embodiment of the present invention, wherein the outer rim of the wheel rotates contactedly engaged with a power wheel and a control roller.
Figure 6:
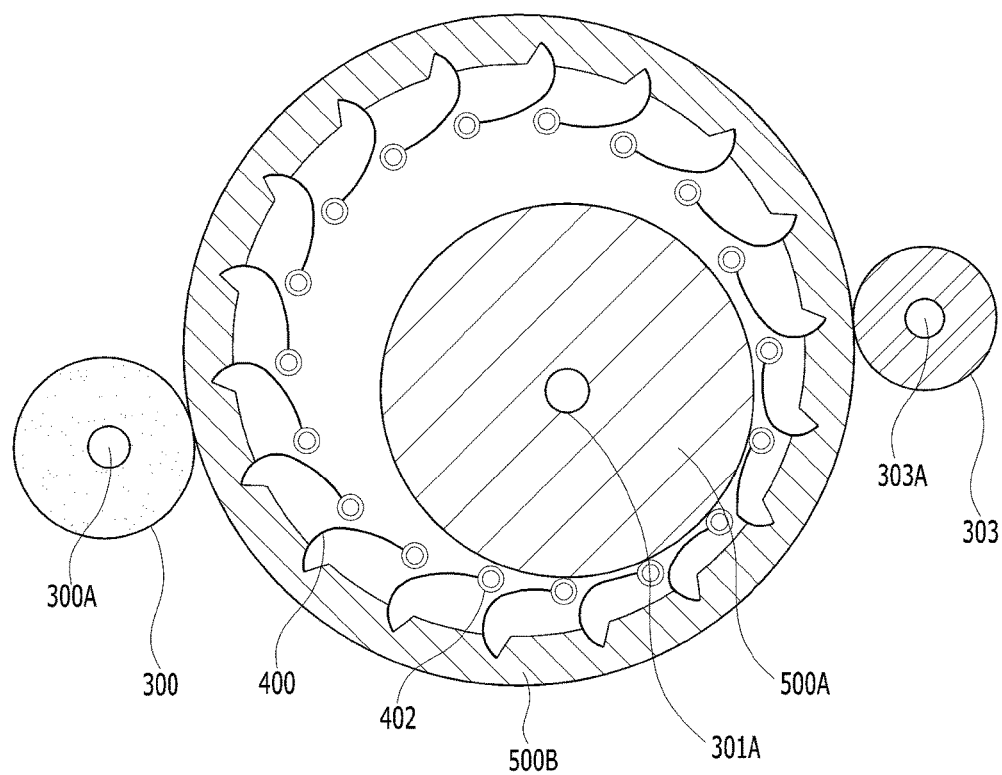
FIG. 6 is a longitudinal sectional view showing rollers mounted on the ends of a plurality of pressure elastic bodies fixedly mounted to the outer rim of the wheel according to the second embodiment of the present invention.

Referring next to FIGS. 1 and 3, an explanation on the operation of the wheel 10 rotated by the load applied to the axle 20A remaining stationary at the eccentric position of the wheel 10 according to the first embodiment of the present invention will be given. The controller roller 50 rotatably fitted to the shaft 50A disposed on the control roller stay 102 of the bicycle frame 100 controls (allows the center of the hub 20 to be spaced apart from the center of the wheel by a given distance) the tire 40 mounted on the outer periphery of the outer rim 10A of the wheel 10 having the hub 20 rotating on the axle 20A mounted on the chain stay 101 of the bicycle frame 100. Accordingly, a load is kept applied in a direction of an arrow a by means of the load applied to the axle 20A always remaining stationary at the eccentric position of the wheel 10 spaced apart horizontally from the center 10C of the wheel 10 by the given distance through the weight of a rider sitting on a saddle 103, so that the wheel 10 can be rotated in a direction of an arrow b by means of the load kept applied to the hub 20 fitted to the axle 20A always remaining stationary at the eccentric position of the wheel 10.

Figure 2:
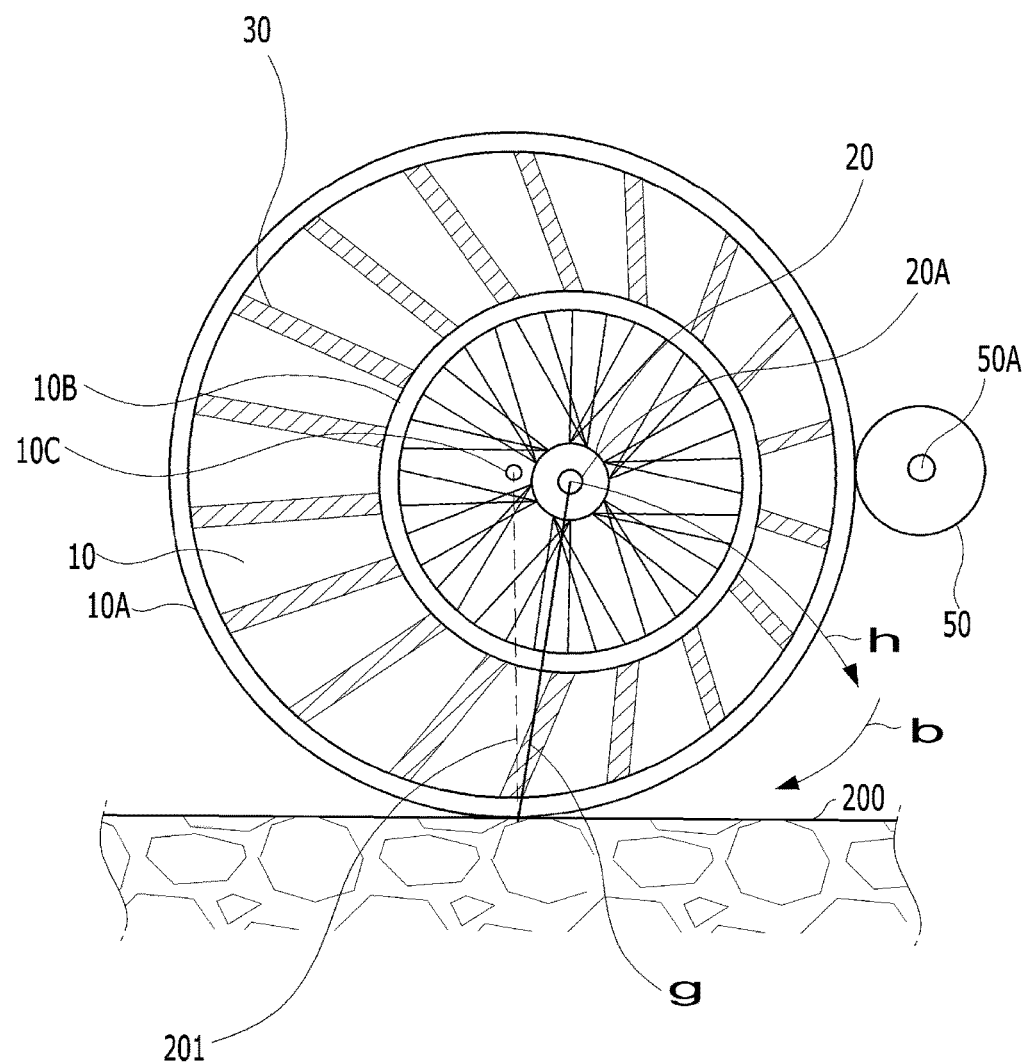
FIG. 2 is a cross sectional view showing the operation of the load applied to an axle mounted on a chain stay of a bicycle.

Referring to FIG. 2, an explanation on the operation of the load applied to the axle 20A will be given.

The load is applied in the direction of the arrow a to the axle 20A always remaining stationary at the eccentric position of the wheel 10, and, thus, the wheel 10 is controlled by the load applied in a direction of an arrow g at the support point 201 at which the wheel 10 does not slide with the friction force generated when the wheel 10 comes into contact with the ground 200 with respect to the support point 201 at which the wheel 10 comes into contact with the ground 200. As a result, the load applied in the direction of the arrow g on the ground 200 by means of the load kept applied to the axle 20A in the direction of the arrow a is applied in a direction of an arrow h, thereby allowing the wheel 10 to be rotated in the direction of the arrow b.

Even if the wheel 10 is kept rotated in the direction of the arrow b, accordingly, the load is kept applied in the direction of the arrow a by means of the load applied to the axle 20A always remaining stationary at the eccentric position of the wheel 10, so that the wheel 10 is rotated in the direction of the arrow b on the ground 200 by means of the load kept applied in the direction of the arrow g to the support point 201 coming into contact with the ground 200 and by means of the load kept applied in the direction of the arrow h from the support point 201 as the starting point.

According to a second embodiment of the present invention, a wheel 500 is configured wherein a plurality of pressure elastic bodies or leaf springs 400 are mounted on the inner periphery of an outer rim 500B thereof, and the outer rim 500B of the wheel 500 is engaged with a control roller 303 and a power wheel 300, without any deviation therefrom.

Further, an axle 301A is fixedly mounted on a load frame 301, and rollers 402 are mounted on the ends of the pressure elastic bodies or leaf springs 400 disposed on the inner periphery of the outer rim 500B of the wheel 500 in such a manner as to come into contact with the outer periphery of a rotation body 500A and to be thus rotatably engaged therewith.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A wheel rotated by a load applied to an axle mounted on a rotation body always remaining stationary at an eccentric position of the wheel spaced apart from the center of the wheel by a given distance, the wheel comprising: a plurality of pressure elastic bodies or leaf springs mounted on the inner periphery of an outer rim of the wheel to apply a given pressure to the outer periphery of the rotation body fitted to the axle to which the load is applied; a load frame connected to a fixed frame by means of a hinge shaft in such a manner as to be movable upward and downward; a power wheel mounted on the fixed frame in such a manner as to be fixedly mounted on the fixed frame to allow the wheel mounted on the axle mounted on the load frame to contactedly operate engagedly therewith; a pressure elastic body connected between the upper portion of the fixed frame and the load frame to allow the load applied to the axle rotatably mounted on the load frame to be kept applied by means of the elastic force generated therefrom; a tension elastic body connected between the lower portion of the fixed frame and the load frame to allow the load applied to the axle rotatably mounted on the load frame to be kept applied by means of the elastic force generated therefrom; and a control roller for allowing the center of the rotation body fitted to the axle to be spaced apart from the center of the wheel by the given distance, whereby the control roller controls the outer rim of the wheel to allow the center of the wheel to be spaced apart from the center of the rotation body by the given distance so that the axle always remains stationary at the eccentric position of the wheel and the drive shaft fixedly mounted on the power wheel engagedly operating with the wheel rotating by the load kept applied to axle mounted on the rotation body is driven.

2. The wheel according to claim 1, wherein the plurality of elastic bodies are a plurality of tension elastic bodies mounted on the inner periphery of the outer rim of the wheel in such a manner as to be connected to the outer periphery of the rotation body, and the control roller controls the outer rim of the wheel to allow the center of the wheel to be spaced apart from the center of the rotation body by the given distance, so that the axle always remains stationary at the eccentric position of the wheel and the drive shaft fixedly mounted on the power wheel engagedly operating with the wheel rotating by the load kept applied to axle mounted on the rotation body is driven.

3. The wheel according to claim 1, wherein if the outer periphery of the outer rim having the plurality of elastic bodies mounted on the inner periphery thereof comes into contact with the control roller and the power wheel to cause the outer rim to be engagedly rotated with the control roller and the power wheel, the outer rim is rotated without any deviation from the control roller and the power wheel, and the control roller controls the outer rim of the wheel to allow the center of the wheel to be spaced apart from the center of the rotation body by the given distance, so that the axle always remains stationary at the eccentric position of the wheel and the drive shaft fixedly mounted on the power wheel engagedly operating with the wheel rotating by the load kept applied to axle mounted on the rotation body is driven.

4. The wheel according to claim 1, wherein the rotation body is fixedly fitted to the axle fixedly mounted on the load frame; the plurality of leaf springs mounted on the inner periphery of the outer rim of the wheel have rollers mounted on the end portions thereof in such a manner as to rotatingly come into contact with the outer periphery of the rotation body; and the control roller controls the outer rim of the wheel to allow the center of the wheel to be spaced apart from the center of the rotation body by the given distance, so that the axle always remains stationary at the eccentric position of the wheel and the drive shaft fixedly mounted on the power wheel engagedly operating with the wheel rotating by the load kept applied to axle mounted on the rotation body is driven.

* * * * *